(12) United States Patent
Miller et al.

(10) Patent No.: US 9,032,640 B1
(45) Date of Patent: May 19, 2015

(54) SELF-NORMALIZING PANEL THICKNESS MEASUREMENT SYSTEM

(71) Applicant: Physical Optics Corporation, Torrance, CA (US)

(72) Inventors: David Harold Miller, San Pedro, CA (US); Christopher Thad Ullmer, San Pedro, CA (US); Edward Matthew Patton, Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 126 days.

(21) Appl. No.: 13/717,476

(22) Filed: Dec. 17, 2012

Related U.S. Application Data (60) Provisional application No. 61/576,289, filed on Dec. 15, 2011.

(51) Int. Cl.
*G01B 5/06* (2006.01)

(52) U.S. Cl.
CPC .......................... *G01B 5/06* (2013.01)

(58) Field of Classification Search
CPC ........................................................ G01B 5/06
USPC ........... 33/712, 783, 784, 792, 793, 794, 805, 33/806
See application file for complete search history.

(56) References Cited

U.S. PATENT DOCUMENTS

| | | | | |
|---|---|---|---|---|
| 703,086 | A * | 6/1902 | Rusbatch | 33/794 |
| 708,931 | A * | 9/1902 | Slocomb | 33/794 |
| 790,665 | A * | 5/1905 | Spalding | 33/794 |
| 2,095,226 | A * | 10/1937 | Bohn | 33/794 |
| 4,034,477 | A * | 7/1977 | Von Voros | 33/784 |
| 4,612,656 | A * | 9/1986 | Suzuki et al. | 377/24 |
| 4,779,352 | A * | 10/1988 | Lang | 33/834 |
| 4,845,854 | A * | 7/1989 | Stevens et al. | 30/227 |
| 4,876,800 | A * | 10/1989 | Pekar et al. | 33/784 |
| 5,067,250 | A * | 11/1991 | Auweiler et al. | 33/783 |
| 5,095,638 | A * | 3/1992 | David et al. | 33/783 |
| 5,430,954 | A * | 7/1995 | Best et al. | 33/793 |
| 6,073,360 | A * | 6/2000 | Struble | 33/783 |
| 6,502,057 | B1 * | 12/2002 | Suzuki | 702/162 |
| 6,505,414 | B2 * | 1/2003 | Fujikawa | 33/813 |
| 6,553,685 | B2 * | 4/2003 | Nishina et al. | 33/815 |
| 6,574,582 | B1 * | 6/2003 | Geiger | 702/162 |
| 6,829,839 | B2 * | 12/2004 | Killough | 33/784 |
| 7,093,373 | B2 * | 8/2006 | Sugai et al. | 33/792 |
| 7,765,712 | B2 * | 8/2010 | Stockman | 33/784 |
| 8,739,427 | B2 * | 6/2014 | Husted | 33/784 |

* cited by examiner

*Primary Examiner* — Christopher Fulton
(74) *Attorney, Agent, or Firm* — Sheppard Mullin Richter & Hampton LLP (57) ABSTRACT

A measurement gauge, comprising a pair of jaws biased in a closed position; a normalizing member surrounding one of the jaws when the pair of jaws is closed, the normalizing member biased in an extended position; a handle coupled to the pair of jaws and normalizing member such that movement from an extended handle position to an retracted handle position opens the pair of jaws and moves the normalizing member to an retracted position.

30 Claims, 6 Drawing Sheets

SELF-NORMALIZING PANEL THICKNESS MEASUREMENT SYSTEM

CROSS-REFERENCE TO RELATED APPLICATIONS

This application claims the benefit of U.S. Provisional Application No. 61/576,289, filed Dec. 15, 2011, which is hereby incorporated herein by reference in its entirety.

STATEMENT OF RIGHTS TO INVENTIONS MADE UNDER FEDERALLY SPONSORED RESEARCH

This invention was made with Government support under contract number FA8650-11C-5100 awarded by the Air Force Research Labs. The Government has certain rights in the invention.

TECHNICAL FIELD

The present disclosure relates generally to industrial metrology, and more particularly, some embodiments relate to systems and methods for panel measurement.

DESCRIPTION OF THE RELATED ART

In industry metrology, micrometers or calipers are used to measure the thickness of a panel or part during high precision manufacturing processes. For example, such measurement systems are used where 100% inspection of critical parts or subassemblies is required to meet critical design tolerances. During this process, the measurements are taken manually and the technician making the measurements typically writes down the result of the measurements on a measurement data sheet. Micrometers and calipers are inherently operator sensitive meaning that one operator will obtain a slightly different measurement than the next operator even though both operators use the same micrometer or caliper and take the measurement in the same location. For this reason, micrometers and calipers are not only calibrated frequently in a manufacturing environment, but before they are used, a test of the reliability and repeatability (R&R) of the gauge is required. This gauge R&R typically requires three operators each making a number of measurements (30 is common) on a known calibrated measurement fixture that simulates the actual parts being measured.

BRIEF SUMMARY OF THE DISCLOSURE

Some implementations provide a self-normalizing, ergonomically designed, intelligent panel thickness measurement system. The system may be a measurement gauge. Implementations are useful in automating the data collection process while also making the operation of the gauge and the measurement that the gauge makes independent of the operator. In some implementations, the measurement gauge comprises jaws that are opened by squeezing a handle. The jaws include a normalizing member that, after releasing the gauge, normalizes the gauge to the part being measured and clamps the gauge to the part being measured. The gauge then makes a measurement and transmits or displays the result.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

Some of the figures included herein illustrate various different viewing angles. Although the accompanying descriptive text may refer to such views as "top," "bottom" or "side" views, such references are merely descriptive and do not imply or require that the implementation or use in a particular spatial orientation unless explicitly stated otherwise.

DETAILED DESCRIPTION

FIGS. 1A-D illustrate various views of a gauge. A handle 100, 116 on the upper portion of the gauge fits the hand of the operator. In some cases, the handle is ergonomically designed to fit the hand of the operator comfortably and the gauge is balanced in the operator's hand in a manner that makes it ergonomically easy to use for any operator.

The handle comprises two parts. A first part of the handle 116 is a housing that includes the mechanical and electrical parts of the gauge. The second part 100 is a squeeze bar which opens the jaws 105, 102, and a normalizing member 103 for placing over the edge of the panel or part to be measured (collectively, "the part to be measured"). The squeeze bar 100 is biased in an extended position (as illustrated in FIG. 1A) when released.

Figure 1A:
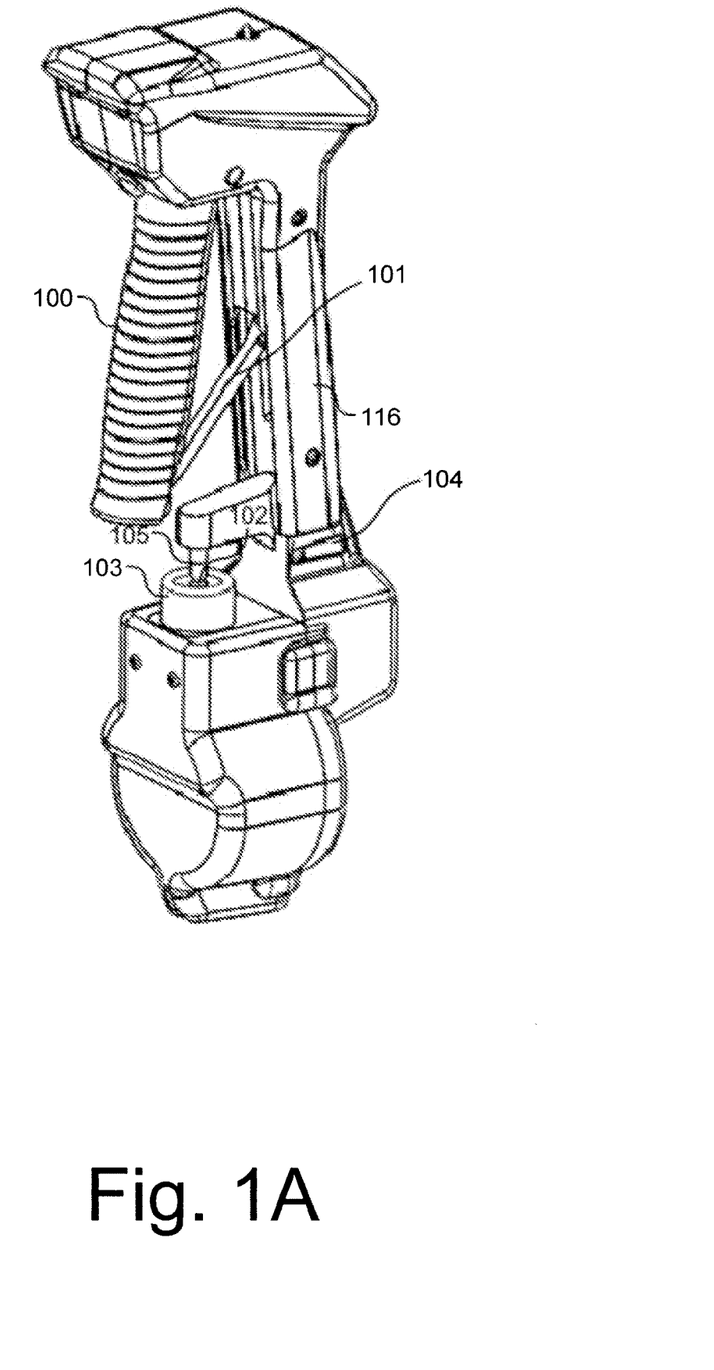
FIGS. 1A-D present various views of a self-normalizing gauge.
Figure 1B:
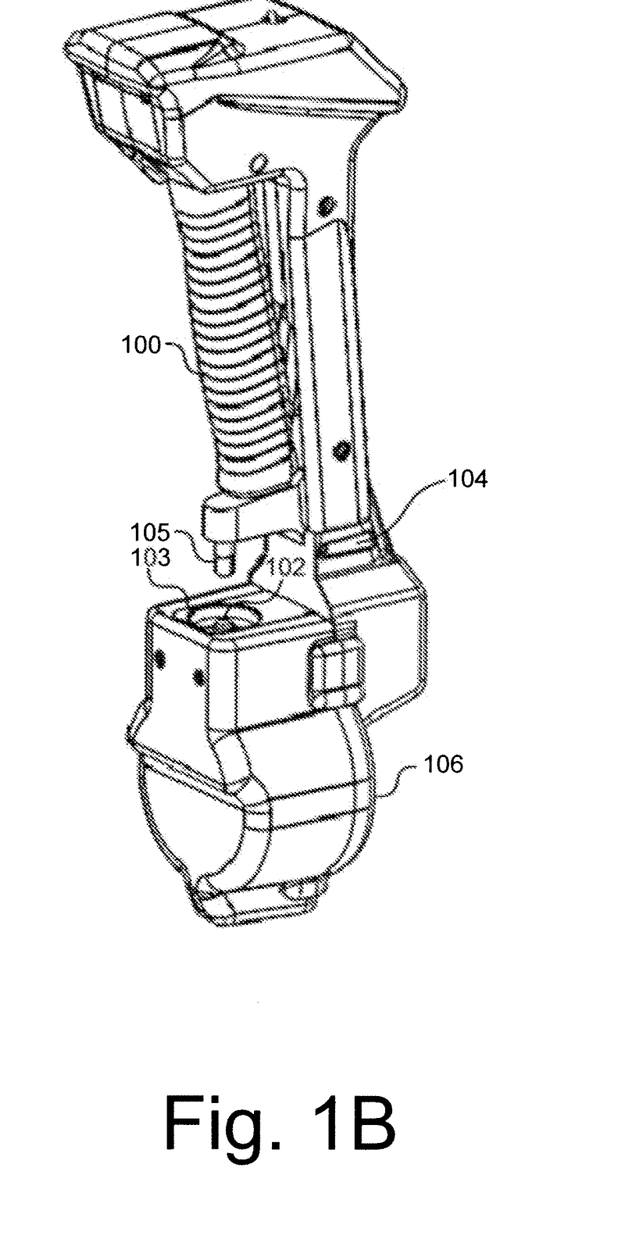
Figure 1C:
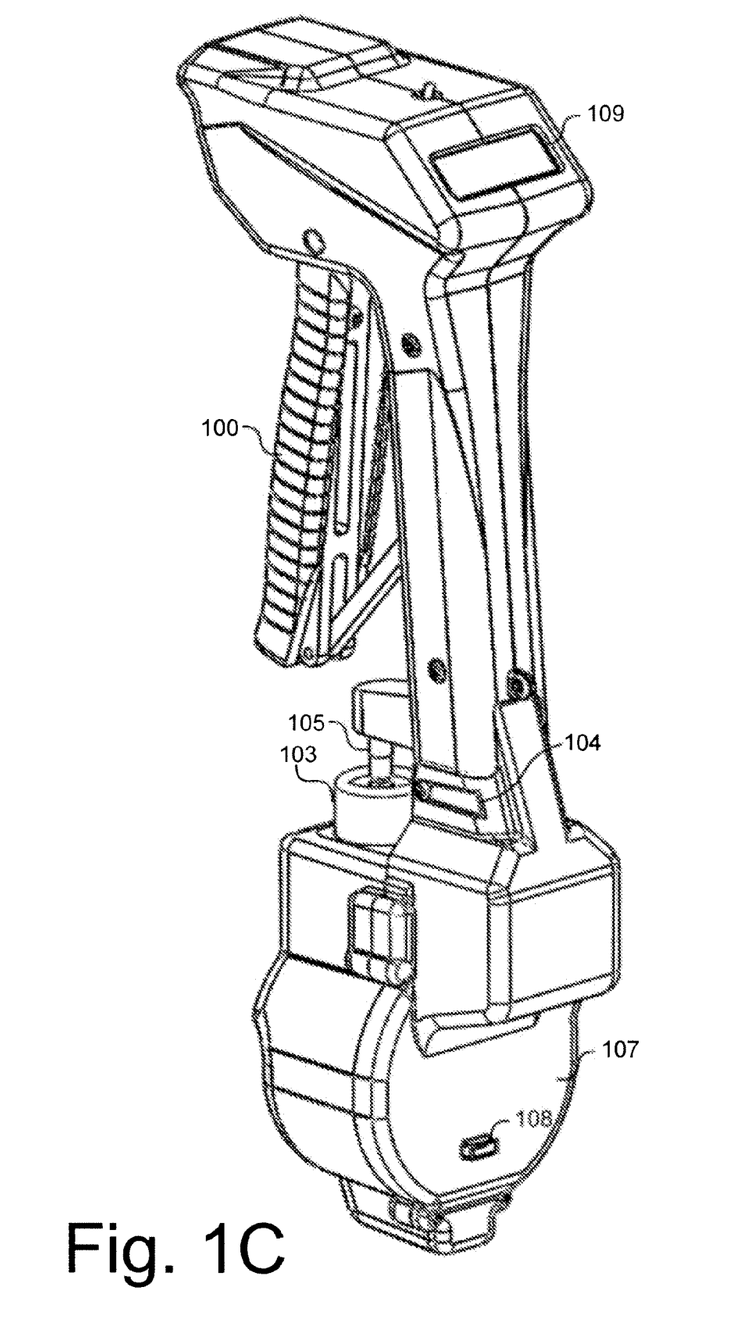

During use, the operator opens the jaws by squeezing the bar 100 towards the housing 116 (as illustrated in FIG. 1B), thereby opening the jaws 105, 102, and retracting the normalizing member 103. The operator then places the part to be measured in the open jaws 105, 102, and releases the gauge. When the gauge is released, the normalizing member 103 normalizes the gauge to the panel or part being measured and an internal spring 111 clamps the gauge onto the panel or part to be measured. The gauge then makes the measurement. In some implementations, the gauge automatically transmits the measurement to a computer either using a wired interface 108 (such as a USB interface) or using a wireless communication module 118. (such as Bluetooth or ZigBee). In other implementations, the measurement is displayed on display 109 or stored in a memory in a control module 117.

FIG. 1A shows the gauge in the closed position and FIG. 1B shows the gauge in the open position. As described above, the gauge comprises a housing 116, a squeeze handle 100, jaws 105, 102, and a normalizing member 103. In the illustrated embodiment, the normalizing member 103 comprises a cup surrounding the lower jaw 102. In this implementation, the upper jaw 105 is fixed and coupled to the housing 116. In other implementations, the normalizing member 103 may surround the upper jaw 105 and the lower jaw 102 may be fixed. The handle 100 is coupled to a linkage 101 that, when actuated, causes the lower jaw 102 and normalizing member 103 to retract into the housing 116 to open the jaws 102, 105 (FIG. 1B).

When performing a measurement, the normalizing member 103 contacts the lower surface of the part to be measured and the upper jaw 105 contacts the upper surface of the part to be measured. The gauge is thereby clamped onto the part to be measured. The normalizing member 103 ensures that the gauge is normal to the surface of the part being measured, even if there is some curvature to the part to be measured, which could make manual measurement difficult. When clamped onto the part, the gauge measures the displacement between the upper jaw 105 and the lower jaw 102. In some implementations, the lower jaw 102 extends independently of the normalizing member 103. In other implementations, the lower jaw 102 is coupled to the normalizing member so that both the lower jaw 102 and normalizing member 103 extend dependently. For example, in some implementations, the lower jaw 102 is integral with the normalizing member 103.

The housing 116 may further comprise mount locations 104, such as keyed slots, for mounting panel hold fixtures or fixtures to secure the parts. These fixtures may be used in a production environment to make the measurement ergonomically easier for the operator.

Figure 1D:
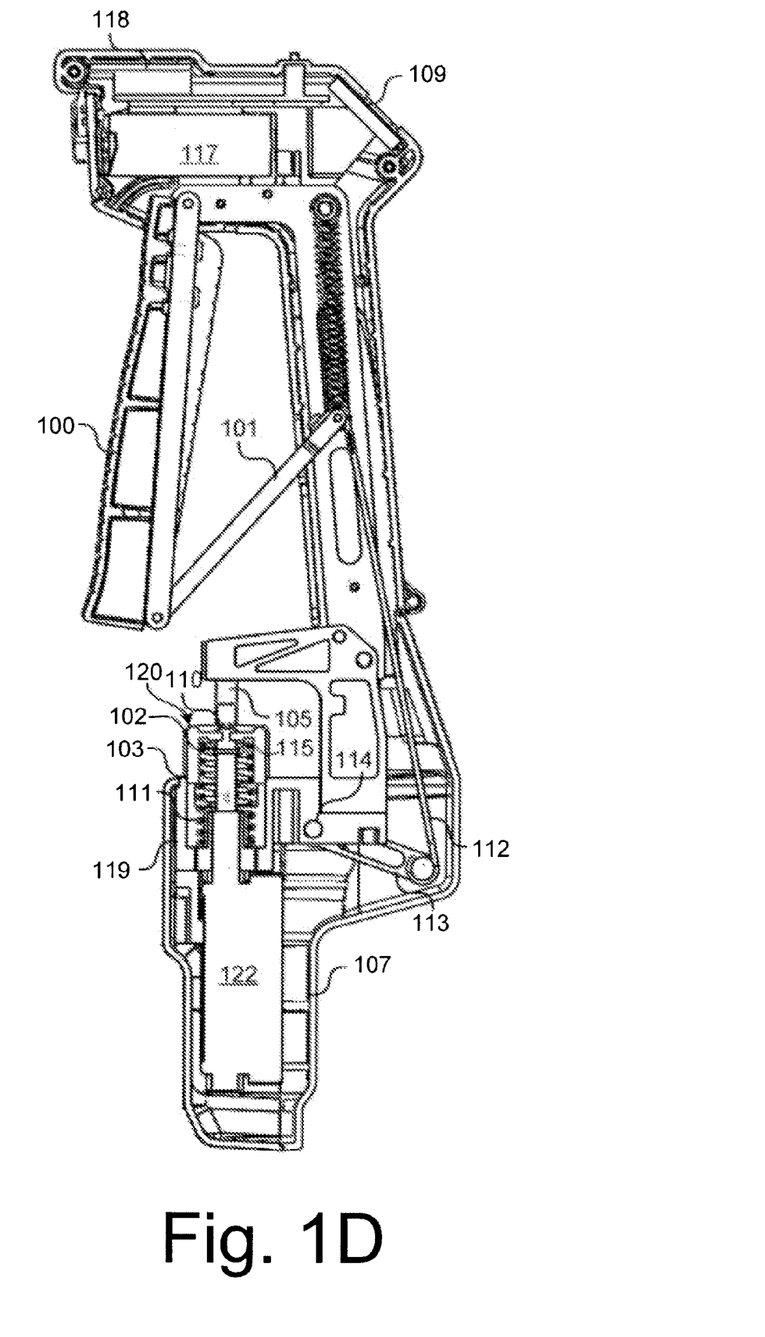

FIG. 1D illustrates a cut away view of the measurement gauge. As illustrated, the handle 100 is coupled to the linkage 101. The linkage 101 is coupled to a second linkage 112, such as a cable, inside the housing 116. The linkage 112 is coupled to a rocker arm 113. The rocker arm 113 is coupled to a lower jaw assembly 119 at hinge 114. The rocker arm 113 is coupled to the normalizing member 103, which slides within the lower jaw assembly 119. As illustrated, spring 111 biases the normalizing member 103 and the handle 100 in the extended position. The normalizing member 103 comprising an upper rim 120 that contacts the surface of the part being measured. The normalizing member 103 further comprises an inner rim 110.

When the handle 100 is squeezed towards the housing 116, the linkage 101 moves up into housing, pulling the linkage 112 upwards. This causes the rocker arm 113 to rotate about hinge 114 and pull the normalizing member 103 down within the lower jaw assembly 119. When the normalizing member 103 is retracted, the inner rim 110 contacts a rim 115 on the lower jaw 102, causing the lower jaw 102 to retract with the normalizing member 103. The lower jaw 102 is otherwise free to move with respect to the normalizing member 103. Accordingly, when the normalizing member 103 extends, the lower jaw 102 is free to extend on its own accord. In this implementation, the lower jaw 102 comprises the spindle and gauge head of a dial indicator or digital indicator 122. When the normalizing member 103 and upper jaw 105 clamp onto the part being measured, the indicator 122 takes a point-to-point measurement between upper jaw 105 and lower jaw 102.

The illustrated gauge further comprises a display 109 coupled to a control module 117. The control module 117 receives measurements from the indicator 122 and displays them on display 109. The control module 117 may further comprise a memory and may be configured to store measurement in the memory. The control module 117 may be coupled to a wireless module 118. The wireless module 118 may be configured to communicate with an external computer. In this case, the control module 117 may use the wireless module 118 to transmit measurements to the external computer. The wireless module may also comprise a locator. For example, the wireless module 118 may comprise a receiver used by the control module 117 to triangulate the gauge location with respect to beacons.

Figure 2:
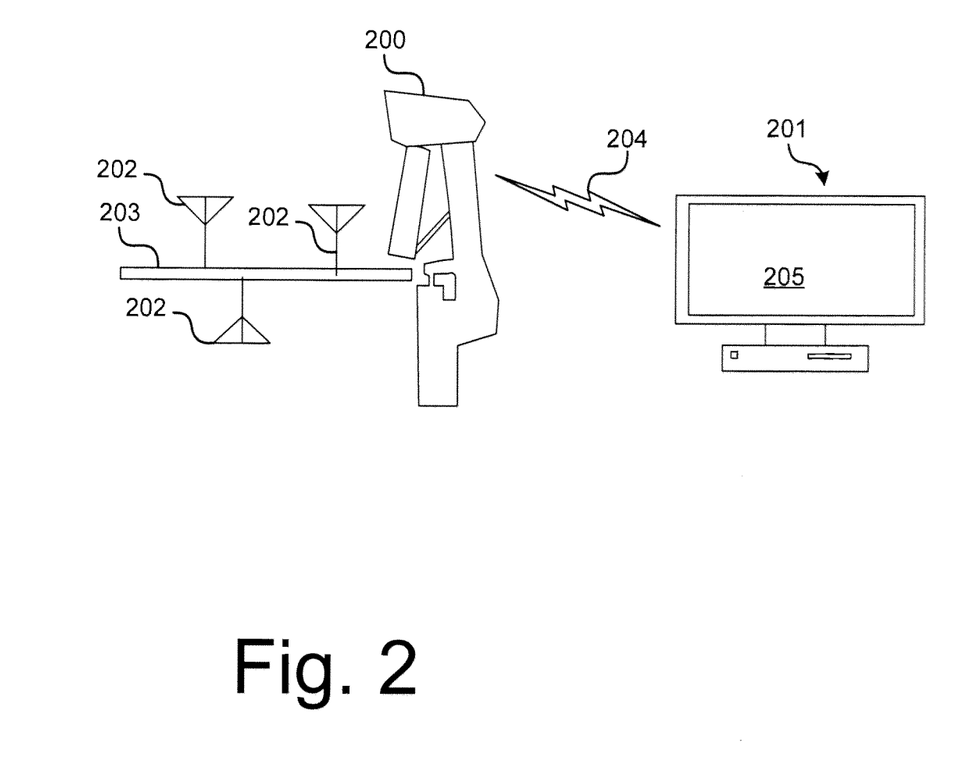
FIG. 2 illustrates a self-normalizing gauge in connection with a computing module.

FIG. 2 illustrates a measurement system in an example environment. The system comprises a self-normalizing gauge 200 in communication 204 with a computer 201. As described above, in some implementations, the communication link 204 comprises a wired link. In other implementations, the communications link 204 comprises a wireless link. Here, the computer 201 is in the vicinity of the operator and the panel 203 being measured. The measurement taken is automatically transmitted to the computer 201, and a visual representation of the panel or part being measured is displayed on the computer screen 205 for use by the operator as guidance in making measurements of the panel or part.

In some implementations, the display on the screen 205 of the computer 201 can have measurement spots that light up or are otherwise indicated as the point on the panel or part to be measured 203 and that also indicate the value of the measurement transmitted to the computer 201 so as to provide instantaneous feedback to the operator that the measurement is not only correctly recorded on the computer 201 but that the measurement that is recorded was taken at the location indicated on the display on the computer screen 205. Also, there is a display (for example, display 109) on the gauge 200 easily visible by the operator to confirm that the measurement taken by the intelligent panel thickness measurement gauge 200 is the same as that transmitted to and recorded by the computer 201.

In other implementations, the intelligent panel thickness measurement gauge 200 can be used without wired or wireless transmission of data for rapid measurement of panels during panel or other part manufacturing operations to measure thickness at any time during any operation that may be necessary for the panel or other part. Measurements made by this implementation can be recorded manually on a computer 201, or they can also be manually written down on a paper log specifically created for that purpose, while still maintaining the ergonomic advantages, self normalizing advantages, and operator independence advantages that may be provided by self-normalizing gauges. In some implementations, the gauge has intelligent electronics on board, so these measurements could also be stored on the gauge itself in digital memory set aside specifically for that purpose.

In a further implementation, the gauge 200 comprises a radio frequency spatial locator that triangulates with at least three other radio frequency transmitters 202 fixed in known locations on the panel or part being measured 203 so as to confirm by RF triangulation the location on the panel or part where the measurement is made. In further implementations, other methods of spatial location may be employed to locate the gauge or the measured position on the panel or part. For example, an implementation could use an angular sensor to determine the location of the measurement being taken.

The system may further comprise a projection system above the part being measured 203 that would provide guidance for the operator by means of a bright spot or color dot on the panel or part being measured 203. This projections system may be driven by the computer 201 that is recording the measurements for the panel or part being measured 203

In further implementations, gauge display 109 may display the panel or part being measured 203 as well as indicate on the display where on the panel or part 203 the measurement is to be taken.

In a still further implementation, the gauge 200 is attached the end effector of a robotic arm which is driven by the computer 201 that records the measurements.

Figure 3:
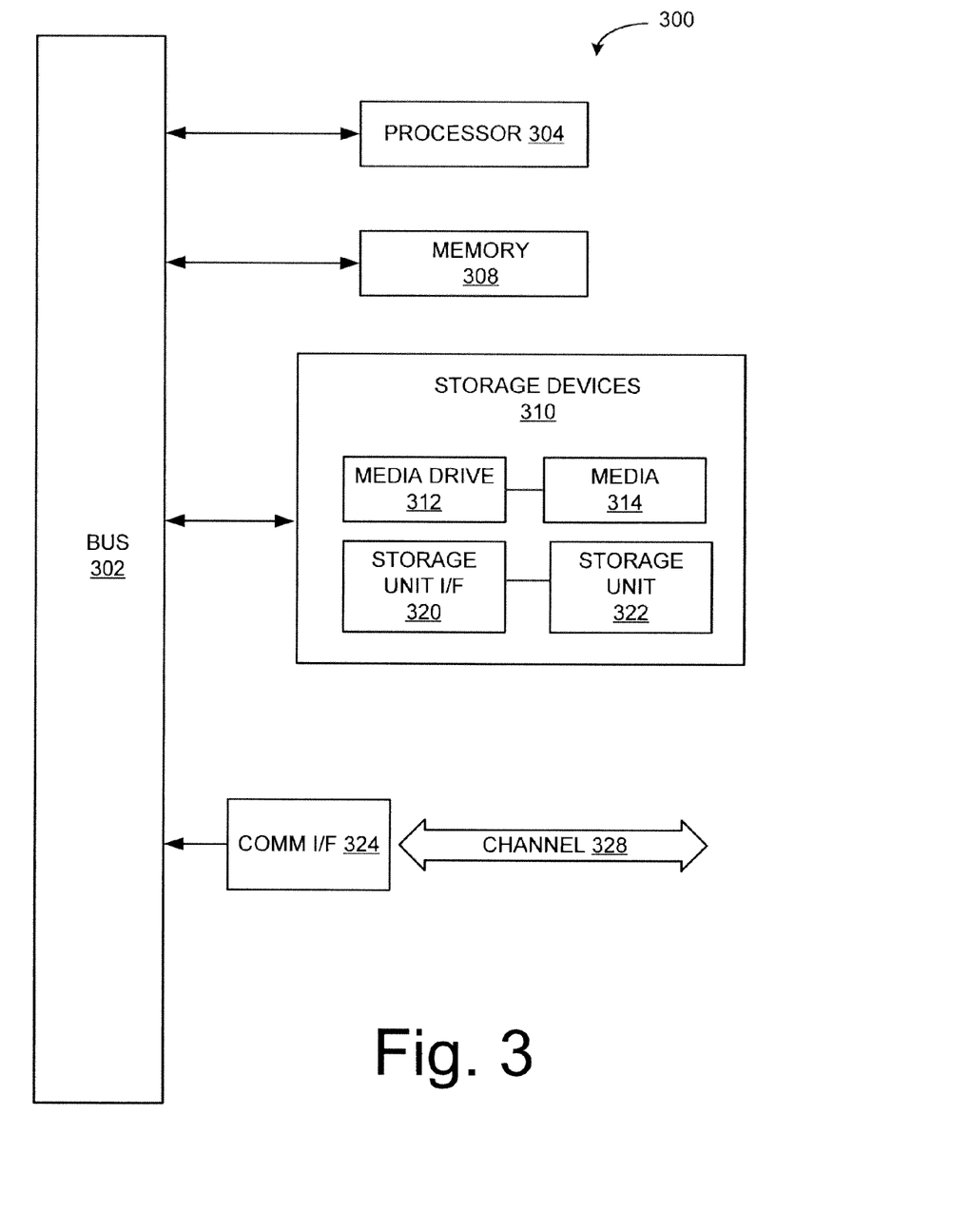
FIG. 3 illustrates an example computing module that may be used in implementing various features.

As used herein, the term module might describe a given unit of functionality that can be performed in accordance with one or more implementation. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 3. Various embodiments are described in terms of this example-computing module 300. After reading this description, it will become apparent to a person skilled in the relevant art how to implement the disclosure using other computing modules or architectures.

Referring now to FIG. 3, computing module 300 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing module 300 or to communicate externally.

Computing module 300 might also include one or more memory modules, simply referred to herein as main memory 308. Memory may include any non-transitory storage medium. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD or DVD drive (R or RW), or other removable or fixed media drive might be provided. Accordingly, storage media 314 might include, for example, a hard disk, a floppy disk, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although described above in terms of various exemplary embodiments and implementations, it should be understood that the various features, aspects and functionality described are not limited in their applicability to the particular embodiment with which they are described, but instead can be applied, alone or in various combinations, to one or more of the other embodiments, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A measurement gauge, comprising:
   a housing;
   a pair of jaws biased in a closed position;
   a normalizing member surrounding one of the jaws when the pair of jaws is closed, the normalizing member biased in an extended position, and configured to retract into the housing when the pair of jaws is open;
   a handle coupled to the pair of jaws and normalizing member such that movement from an extended handle position to an retracted handle position opens the pair of jaws and moves the normalizing member to an retracted position; and
   a digital reader configured to automatically measure a distance between the jaws after the handle is released, the normalizing member extends, and the jaws close on a part to be measured.

2. The measurement gauge of claim 1, further comprising a wireless communications module coupled to the reader and configured to transmit measurement readings.

3. The measurement gauge of claim 1, further comprising a wired communications module coupled to the reader and configured to transmit measurement readings.

4. The measurement gauge of claim 1, further comprising a display coupled to the reader and configured to display measurement readings.

5. The measurement gauge of claim 1, further comprising a memory coupled to the reader and configured to store measurement readings.

6. The measurement gauge of claim 1, further comprising a spatial locator configured to triangulate the gauge location with respect to at least three beacons placed on the part to be measured.

7. The measurement gauge of claim 6, further comprising a display coupled to the locator and the reader, the display configured to display gauge location information and measurement readings.

8. The measurement gauge of claim 1, wherein the normalizing member comprises a cup.

9. The measurement gauge of claim 8, wherein the jaw not surrounded by the normalizing member is fixed.

10. The measurement gauge of claim 9, wherein the normalizing member normalizes the gauge relative to a contact point of the fixed jaw after the handle is released.

11. The measurement gauge of claim 1, wherein:
    the handle is coupled to a first linkage;
    the first linkage is coupled to a second linkage; and
    the second linkage is coupled to a rocker arm configured to pull the normalizing member into the housing during movement from the extended handle position to the retracted handle position.

12. The measurement gauge of claim 1, wherein the normalizing member comprises a rim that causes the jaw surrounded by the normalizing member to retract with the normalizing member.

13. The measurement gauge of claim 12, wherein the jaw surrounded by the normalizing member is coupled to the normalizing member such that the jaw and normalizing member extend dependently.

14. The measurement gauge of claim 12, wherein the jaw surrounded by the normalizing member extends independently of the normalizing member.

15. A method, comprising:
    squeezing a handle of a gauge to open a pair of jaws biased in a closed position and move a normalizing member from an extended position to an retracted position, wherein the normalizing member retracts into a housing of the gauge;

releasing the handle such that the normalizing member extends and the jaws close; and a digital reader automatically measuring a distance between the jaws after the handle is released, the normalizing member extends, and the jaws close on a part to be measured.

16. The method of claim 15, further comprising transmitting measurement readings from a wireless communications module coupled to the reader.

17. The method of claim 15, further comprising transmitting measurement readings from a wired communications module coupled to the reader.

18. The method of claim 15, further comprising displaying measurement readings on a display coupled to the reader.

19. The method of claim 15, further comprising recording measurement readings on a memory coupled to the reader.

20. The method of claim 15, further comprising locating the gauge using a locator disposed in the gauge.

21. The method of claim 20, further comprising displaying measurement readings and location information on a display coupled to the reader.

22. The method of claim 15, wherein the normalizing member comprises a cup.

23. The method of claim 22, wherein the jaw not surrounded by the normalizing member is fixed.

24. The method of claim 23, further comprising normalizing the gauge relative to a contact point of the fixed jaw after the handle is released.

25. A measurement system, comprising:

a computer;

a gauge in communication with the computer, the gauge comprising:

a housing;

a pair of jaws biased in a closed position;

a normalizing member surrounding one of the jaws when the pair of jaws is closed, the normalizing member biased in an extended position, and configured to retract into the housing when the pair of jaws is open;

a handle coupled to the pair of jaws and normalizing member such that movement from an extended handle position to a retracted handle position opens the pair of jaws and moves the normalizing member to an retracted position; and a digital reader configured to automatically measure a distance between the jaws after the handle is released, the normalizing member extends, and the jaws close on a part to be measured.

26. The measurement system of claim 25, wherein the gauge further comprises a wireless communications module coupled to the reader and configured to transmit measurement readings to the computer.

27. The measurement system of claim 25, wherein the gauge further comprises a wired communications module coupled to the reader and configured to transmit measurement readings to the computer.

28. The measurement system of claim 25, wherein the computer is configured to display a visual representation of the part being measured.

29. The measurement system of claim 28, wherein the computer is configured to display a measurement location on the visual representation of the part being measured.

30. The measurement system of claim 28, wherein the computer is configured to display a measurement taken at a measurement location on the visual representation of the part being measured.

* * * * *